United States Patent [19]

Matsuo et al.

[11] Patent Number: 4,640,975
[45] Date of Patent: Feb. 3, 1987

[54] POLYCYANOARYL ETHER AND METHOD OF PREPARING THE SAME

[75] Inventors: Shigeru Matsuo; Tomoyoshi Murakami, both of Sodegaura, Japan

[73] Assignee: Idemitsu Kosan Company Limited, Tokyo, Japan

[21] Appl. No.: 813,620

[22] Filed: Dec. 26, 1985

[30] Foreign Application Priority Data

Jan. 10, 1985 [JP] Japan .................................. 60-1403
Mar. 26, 1985 [JP] Japan ................................. 60-59466
Apr. 5, 1985 [JP] Japan .................................. 60-71208

[51] Int. Cl.$^4$ ............................................ C08G 65/40
[52] U.S. Cl. .................................... 528/211; 528/210; 528/219
[58] Field of Search ......................... 528/210, 211, 219

[56] References Cited

U.S. PATENT DOCUMENTS

| | | | |
|---|---|---|---|
| 3,730,946 | 5/1973 | Heath et al. | 260/47 |
| 3,784,504 | 1/1974 | Feasey | 528/211 |
| 4,042,567 | 8/1977 | Sundermann | 528/211 |
| 4,108,837 | 8/1978 | Johnson et al. | 528/211 |
| 4,567,248 | 1/1986 | Blinne et al. | 528/211 |

FOREIGN PATENT DOCUMENTS 0121257 10/1984 European Pat. Off. .

Primary Examiner—Harold D. Anderson
Attorney, Agent, or Firm—Frishauf, Holtz, Goodman & Woodward

[57] ABSTRACT

A polycyano aryl ether which has recurring units each represented by the formula:

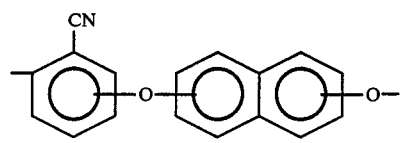

(I)

and a reduced viscosity of which is 0.3 dl/g or more at 60° C. in a solution in which the polycyanoaryl ether is dissolved in p-chlorophenol in a concentration of 0.2 g/dl.

A method for preparing the above-mentioned polycyanoaryl ether which comprises reacting a dihalogenobenzonitrile represented by the formula:

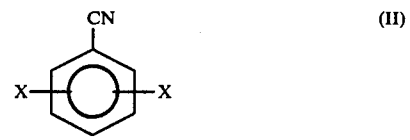

(II)

wherein X is a halogen atom,
with an alkali metal salt of dihydroxynaphthalene represented by the formula:

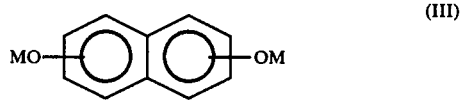

(III)

wherein M is an alkali metal,
in the presence of a solvent.

And a method for preparing a polycyanoaryl ether powder without mechanical grinding steps for purification, which comprises adding to the resulting reaction mixture of the above-mentioned polycondensation reaction a solvent which does not dissolve the resulting polymer but has compatibility with the solvent used in polycondensation when the concentration of the resulting polymer dissolved in the resulting rection mixture reaches to the range of from 2 to 20% by weight.

The polymer of this invention is excellent in mechanical strength, fire retardance and solvent resistance. Further, the method of this invention can prepare the high molecular weight polycyanoaryl ether with ease and with high productivity when compared with a conventional method. Moreover, if the method for preparing the polycyanoaryl ether powder of this invention is applied, a mechanical process for grinding the resulting polymer will be unnecessary, the powder prepared by this invention is finer than the conventionally pulverized powder and the subsequent purification process is carried out to a sufficient degree.

18 Claims, No Drawings

POLYCYANOARYL ETHER AND METHOD OF PREPARING THE SAME

BACKGROUND OF THE INVENTION

This invention relates to a polycyanoaryl ether and a method of preparing the same. More specifically, this invention relates to a polycyanoaryl ether which is excellent in heat resistance and which has good fire retardance, solvent resistance and mechanical strength, and a method of preparing the same. Further, this invention relates to a method of preparing a polycyanoaryl ether in which high molecular weight polymer is easily obtained and productivity is high. Furthermore, it relates to a method of preparing a sufficiently purified fine polycyanoaryl ether powder without requiring any process of grinding the prepared polymer.

As materials for electrical and electronic equipments and mechanical parts, polycyanoaryl ethers have been known.

In Japanese Unexamined Patent Publications Nos. 14270/1972 and 206433/1984, polycyanoaryl ethers having various structures are disclosed. These polymers have excellent mechanical properties and are useful as industrial materials, but their heat resistance is not considered to be satisfactory.

These polycyanoaryl ethers may be prepared as undermentioned. For example, in Japanese Unexamined Patent Publication No. 14270/1972, a method is disclosed in which dinitrobenzonitrile is reacted with a divalent phenol to prepare the polycyanoaryl ether. However, the polycyanoaryl ether prepared by such a method is poor in heat resistance as mentioned above, and does not have a sufficiently high molecular weight.

In addition thereto, this polymer is relatively coarse, and thus a mechanical grinding is necessary to pulverize it into a sufficiently fine state for a purification step. In this grinding process, a great deal of energy is consumed, and since the grain diameter of the thus ground powder is relatively large, it is difficult to obtain a satisfactory purification effect.

SUMMARY OF THE INVENTION

An object of this invention is to provide a polycyanoaryl ether which can overcome the above-mentioned drawbacks, being excellent in heat resistance, and having good mechanical strength, solvent resistance and fire retardance, and a method for preparing the same. Another object of this invention is to provide a method for preparing a sufficiently highly polymerized polycyanoaryl ether with ease and with high productivity. Still another object is to provide a method for directly preparing a fine polycyanoaryl ether powder after the completion of a polymerization reaction, which method renders unnecessary a preliminary mechanical grinding process for purification of the polymer.

A polymer of this invention comprises having a recurring unit represented by the following formula:

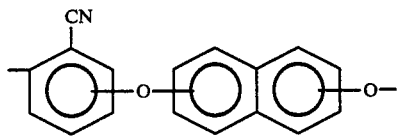
(I)

and possessing a reduced viscosity of 0.3 dl/g or more at 60° C. in a solution in which the polycyanoaryl ether is dissolved in p-chlorophenol in a concentration of 0.2 g/dl.

A method for preparing the novel polymer of this invention comprises reacting a dihalogenobenzonitrile represented by the formula:

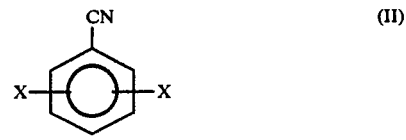
(II)

wherein X is a halogen atom, with an alkali metal salt of dihydroxynaphthalene represented by the formula

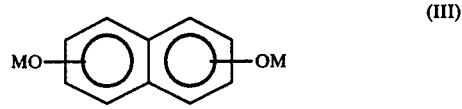
(III)

wherein M is an alkali metal, in the presence of a solvent.

Heretofore, in polymerizing the polycyanoaryl ether, a charge amount of reactants have been limited to a small amount because a large amount of reactants, i.e., charge, would lead to difficulty in the reaction control and for other reasons. However, the present inventors have found the following fact: If carried out inversely in that a larger amount of the charge is used than in a conventional process, the polymerization can be achieved more effectively than that of the conventional process, and the reaction time necessary for polymerization is also shorter than in the conventional art, with the result that the productivity of the polymer can be improved. Further, the thus prepared polymer has better mechanical properties than in the conventional art. On the basis of this fact, the following method of obtaining a high molecular weight polycyanoaryl ether was developed.

That is, a preferable embodiment of this invention is directed to a method for preparing a polycyanoaryl ether which comprises reacting a dihalogenobenzonitrile with an alkali metal salt of dihydroxynaphthalene in the presence of an aprotic polar solvent, and then treating the resulting product with water or an alcohol, in which the dihalogenobenzonitrile and the alkali metal salt of dihydroxynaphthalene are each fed in a proportion of 0.07 to 0.2 mole per deciliter of the aprotic polar solvent.

Further, another preferable embodiment of this invention is directed to a method for preparing a polycyanoaryl ether powder which comprises reacting a dihalogenobenzonitrile with at least one of the alkali metal salts of dihydroxynaphthalene, an alkali metal salt of 1,5-dihydroxynaphthalene and 1,6-dihydroxynaphtalene to effect the polycondensation reaction in the presence of a solvent, and then adding to the resulting reaction mixture a solvent which does not dissolve the resulting polymer but has compatibility (i.e., miscibility) with the solvent used in polycondensation when the concentration of the resulting polymer dissolved in the reaction mixture reaches to the range of 2 to 20% by weight.

DESCRIPTION OF THE PREFERRED EMBODIMENTS

The polycyanoaryl ether of this invention is a polymer in which its fundamental skeleton is composed of a plurality of straight joined recurring units of the formula (I) and both ends of the skeleton are terminated with a hydrogen atom,

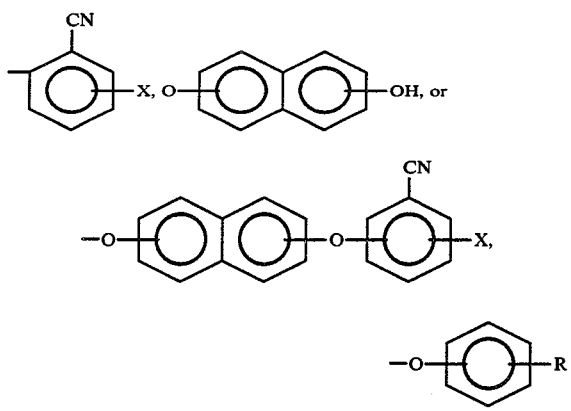

wherein R is a hydrogen atom, an alkyl group having 1 to 10 carbon atoms, an aryl group, an aralkyl group or a cyano group.

The polycyanoaryl ether of this invention is a polymer having such a molecular weight that is reduced viscosity ($\eta sp/c$) is 0.3 dl/g or more at 60° C. in a solution which has been prepared by dissolving polycyanoaryl ether in p-chlorophenol so that its concentration may be 0.2 g/dl. When having such a polymerization degree that the reduced viscosity is 0.3 dl/g or less, the polycyanoaryl ester will be poor in mechanical strength and heat resistance, and thus lacking in practicability.

The polycyanoaryl ether of this invention can be prepared as shown below:

A dihalogenobenzonitrile represented by the formula (II) and an alkali metal salt of dihydroxynaphthalene represented by the formula (III) are dissolved in a solvent as described hereinafter, and they are allowed to react with each other under conditions as also described hereinafter.

As the halogens X in the compound represented by the formula (II), Cl and F are preferred. The specific compounds represented by the formula (II) include 2,4-dichlorobenzonitrile, 2,6-dichlorobenzonitrile, 2,4-difluorobenzonitrile and 2,6-difluorobenzonitrile. Above all, 2,6-dichlorobenzonitrile is preferred.

In the compound represented by the formula (III), M may be any of alkali metal, but is preferably Na and K. The compound of the formula (III) may be prepared by the neutralization reaction of dihydroxynaphthalene with an alkali metal salt such as potassium carbonate and potassium hydroxide.

In proceeding the above-mentioned reaction, for example, dihydroxynaphthalene and such an alkali metal salt as mentioned above may be added in the reaction system instead of using the compound of the formula (III) at the start of the reaction. In this case, the compound of the formula (III) will be produced in the system with the progress of the reaction.

In the case that a reaction is carried out by feeding dihydroxynaphthalene and the alkali metal salt together to the reaction system, dihydroxynaphthalene is preferably fed in an approximately equimolar amount to or in a little less amount than the dihalogenobenzonitrile, and the alkali metal salt is preferably fed in an equimolar amount to or in an amount more than dihydroxynaphthalene.

Amounts of the used compounds represented by the formulae (II) and (III) depend upon the polymerization degree of the desired polymer. Both compounds are preferably employed in substantially equimolar amounts, but even if not equimolar, there is no inconvenience.

The reaction is carried out in a solvent. As the solvent, usable for this reaction, any type of solvent can be acceptable. Examples of such solvents include dimethyl sulfoxide, sulfolane, N-methylpyrrolidone, N-methylacetamide, N-methylformamide, dimethylacetamide, dimethylformamide, diethylsulfoxide and dimethylsulfolane. Among these compounds, sulfolane and N-methylpyrrolidone are preferred.

In the polymerization reaction, together with the aforementioned solvent, there may be used a solvent which is azeotropic with water, for example toluene, benzene, xylene, ethylbenzene and chlorobenzene. An amount of the azeotropic solvent to be used may be an amount enough to remove, by azeotropy, the resultant solution which is produced in the reaction of dihydroxynaphthalene and the alkali metal salt.

The reaction temperature is within the range of 150° to 350° C., preferably 180° to 250° C., and the reaction time is within the range of 0.5 to 5 hours, preferably 1 to 3 hours. Further, the reaction may be carried out under ordinary pressure or a slightly elevated pressure.

In this process, it is preferable to add, as a molecular weight modifier, a monovalent phenol represented by the formula:

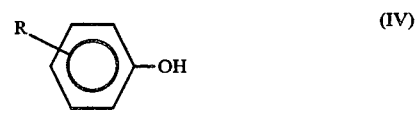

wherein R is a hydrogen atom, an alkyl group having 1 to 10 carbon atoms, an aryl group, an aralkyl group or a cyano group.

In the compound represented by the formula (IV), as the aryl group, for example,

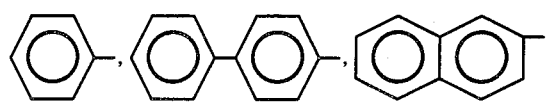

are preferred, and as the aralkyl groups, for example,

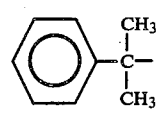

is preferred.

Examples of the monovalent phenols represented by the formula (IV) include

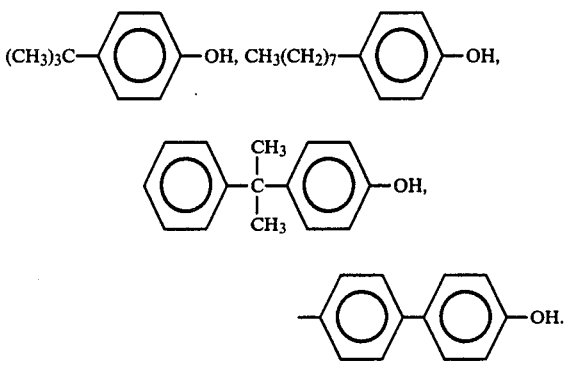

Further, the amount of the molecular weight modifier which is employed depends upon the molecular weight of the desired polymer.

Next, the reaction product thus prepared in the above process is treated with water or an alcohol in order to eliminate the alkali metal present at terminals of the reaction product and substitute H or OH at the terminals. As the alcohols, methanol and ethanol are preferred, and such a treatment can be carried out by throwing the reaction product into water or the alcohol.

Still another preferred embodiment of this invention is directed to a method for accomplishing a further high molecular weight polymerization of a polycyanoaryl ether as shown below.

In the above method, a dihalogenobenzonitrile and an alkali metal salt of dihydroxynaphthalene which are starting materials preferably are each fed in an amount of 0.07 to 0.2 mole per deciliter of an aprotic polar solvent.

When the feed proportion of each starting material deviates from the above-mentioned range toward less than 0.07 mole, the polymerization will make progress but the reaction will be delayed and thus will take a long period of time. Therefore, such a condition is not practical and industrial. On the contrary, when it exceeds 0.2 mole, the viscosity of the reaction product will be so high that reaction controls such as stirring and temperature controls will be difficult, so that the predetermined polymerization reaction will not progress smoothly. The preferable amount of each of the starting materials is within the range of 0.1 to 0.15 mole.

On the other hand, with regard to the feed proportion between the dihalogenobenzonitrile and the alkali metal salt of dihydroxynaphthalene, the dihalogenobenzonitrile is preferably fed in an equimolar amount to or in a little larger amount than the alkali metal salt of dihydroxynaphthalene.

At the completion of the polymerization reaction under the above-mentioned conditions, the concentration of the resulting polymer will be from 20 to 50 g/dl (which concentration indicates the weight of the produced polymer per deciliter of the aprotic polar solvent), which means the accomplishment of the polymerization.

According to the above-mentioned method, a polymer can be prepared which has such a high molecular weight that the reduced viscosity ($\eta sp/c$) is 1.0 dl/g or more at 60° C. in a solution in which the polymer is dissolved in p-chlorophenol in the concentration of 0.2 g/dl, and the reaction time can be less when compared with the conventional manufacturing process.

A further preferable embodiment of this invention is directed to a method for preparing a polycyano aryl ether powder, and this method is shown below.

The starting material to be used together with a dihalogenobenzonitrile is at least one of the alkali metal salts of 2,7-dihydroxynaphthalene, 1,5-dihydroxynaphthalene and 1,6-dihydroxynaphtalene. As the alkali metal salts, for example, a sodium salt and a potassium salt are preferred.

This embodiment of this invention comprises a first process of reacting the dihalogenobenzonitrile with at least one of the alkali metal salts of 2,7-dihydroxynaphthalene, 1,5-dihydroxynaphthalene and 1,6-dihydroxynaphtalene to effect a polycondensation reaction in order to prepare a polymer, and a second process of adding to the reaction system after the completion of the polycondensation reaction a solvent which does not dissolve the resulting polymer and is compatible with the solvent used in the polycondensation to deposit a fine powder.

When this polycondensation reaction process is over, the thus prepared polymer will be present in a dissolving state in the polymerization solvent.

Afterward, in the second process, there is added to the resulting reaction mixture, a solvent which does not dissolve the reaction polymer and is compatible (i.e., misible) with the solvent used in polycondensation. Such solvents include water, methanol, ethanol, propanol, butanol, acetone, methyl ethyl ketone, methyl isobutyl ketone, $\gamma$-butyrolactone and tetrachloroethane, and above all, water and methanol are preferred.

The solvent used in the second process must be added when the concentration of the produced polymer reaches to the range of 2 to 20% by weight. That is, the polymer produced in the resulting reaction mixture in the above-mentioned first process begins to deposit gradually in the reaction mixture owing to a temperature fall. Along with this phenomenon, the concentration of the polymer dissolved in the reaction mixture is slowly lowered. When this concentration reaches to the range of 2 to 20% by weight, the above-mentioned non-solvent is to be added thereto.

If the concentration of the polymer is less than 2% by weight, the polymer powder will be too small to handle; if it is more than 20% by weight, the deposited polymer will be in the state of masses which are hard to powder. In consequence, the concentration of the polymer is preferably within the range of 4 to 15% by weight.

The amount of the solvent used in the second process is within the range of 30 to 300% by volume, preferably 50 to 200% by volume of the solvent used in the polycondensation, and the temperature of the reaction mixture at the addition of the solvent used in the second process is within the range of 20° to 60° C., preferably 30° to 40° C.

According to this process, the polymer can be produced in the form of an extremely fine powder, and thus a mechanical pulverization process as a preliminary step for purification is unnecessary. Furthermore, in the subsequent purification process, a satisfactory effect can be obtained.

This invention will be further described in accordance with the following examples.

EXAMPLE 1

In a 300 ml separating flask equipped with a fractionating device, a stirrer and an argon gas blowing pipe were placed 8.6 g (0.05 mole) of 2,6-dichlorobenzonitrile, 7.928 g (0.0495 mole) of 2,7-dihydroxynaphthalene, 8.3 g (0.06 mole) of potassium carbonate, 100 ml of sulfolane and 50 ml of toluene. A reaction was then carried out at 160° C. for 1.5 hours and at 200° C. for 2 hours while an argon gas was blowing thereinto. After the completion of the reaction, a polymer was caused to deposit in methanol and was then pulverized by means of a blender made by Warning Co., Ltd. Afterward, the pulverized material was washed with 1 l of water and subsequently 1 l of methanol and was then dried, thereby producing a polymer. The amount and yield of the resulting polymer were 12.8 g and 99%, respectively.

Further, the reduced viscosity ($\eta$sp/c) of the polymer was 1.00 dl/g at 60° C. in a solution in which the polymer is dissolved in the p-chlorophenol in concentration of 0.2 g/dl (also in the following examples, the viscosity measurement was carried out in the same manner).

From the thus prepared polymer, film was formed by a press molding, and by the use of the thus formed film, an infrared ray absorption spectra (IR) analysis was accomplished. As a result, there were observed absorption peaks due to the existence of a C—H bond of a benzene ring at 3030 cm$^{-1}$ and 830 cm$^{-1}$, a C—C bond of the benzene ring at 1590 cm$^{-1}$, an aromatic ether bond at 1240 cm$^{-1}$ a nitrile group at 2220 cm$^{-1}$.

With regard to thermal properties of the film, the glass transition temperature (hereinafter referred to as Tg) was 220° C., the melting point was 350° C., and the thermal decomposition beginning temperature (hereinafter referred to as Td) was 520° C. (in air).

Further, the mechanical properties of this polymer film were as follows:
Breaking strength: 1,300 kg/cm$^2$ (ASTM D 638)
Elongation: 10% (ASTM D 638)
Tensile elastic modulus: 27,000 kg/cm$^2$ (ASTM D 638)
Bending strength: 1,600 kg/cm$^2$ (ASTM D 790)
Bending elastic modulus: 36,000 kg/cm$^2$ (ASTM D 790)

The above values were measured in accordance with the respective ASTM's noted thereto.

Next, the solvent resistance of this polymer was inspected, and it was found that the polymer was insoluble in the following solvents: acetone, methanol, toluene, methylene chloride and chloroform.

With regard to fire retardance, a test was carried out by putting the film of the polymer in a flame of a lighter for 10 seconds and afterward taking it therefrom. In this test, the fire went out immediately when the film had been taken from the flame, and no molten droplets fell. These facts indicate that the fire retardance of the polymer was good.

EXAMPLE 2

A reaction was carried out in the same manner as in Example 1 with the exception that 7.928 g (0.0495 mole) of 1,6-dihydroxynaphthalene were used in place of 2,7-dihydroxynaphthalene. As a result, the amount and yield of the resulting polymer were 12.7 g and 99%, respectively. The reduced viscosity thereof was 0.80 dl/g. The results of IR analysis were the same as in Example 1. Tg and Td were 220° C. and 520° C., respectively. Further, its solvent resistance and fire retardance were similar to those of Example 1.

EXAMPLE 3

A reaction was carried out in the same manner as in Example 1 with the exception that the compound of 3.964 g (0.02475 mole) of 1,6-dihydroxynaphthalene and 3.964 g (0.02475 mole) of 2,7-dihydroxynaphthalene were used as the dihydroxynaphthalene compounds. As a result, the amount and yield of the reaction polymer was 12.8 g and 99%, respectively. The reduced viscosity thereof was 0.82 dl/g. The results of IR analysis were the same as in Example 1. Tg and Td were 220° C. and 518° C., respectively. Further, its solvent resistance and fire retardance were similar to those of Example 1.

EXAMPLE 4

In the same separating flask as in Example 1 were placed 17.201 g (0.1 mole) of 2,6-dichlorobenzonitrile, 15.859 g (0.099 mole) of 2,7-dihydroxynaphthalene, 16.58 g (0.12 mole) of potassium carbonate and 100 ml of sulfolane. A reaction was then carried out at 220° C. for 2.5 hours while argon gas was blowing thereinto. After the completion of the reaction, the treatment was carried out in the same manner as in Example 1, thereby producing 25.7 g (yield 100%) of a polymer. The reduced viscosity ($\eta$sp/c) of the thus produced polymer was 1.28 dl/g. The results of IR analysis were the same as in Example 1. Tg and Td were 220° C. and 520° C., respectively. Further, its solvent resistance and fire retardance were similar to those of Example 1.

EXAMPLE 5

In a 300 ml separating flask equipped with a stirrer, a fractionating device and an argon gas blowing pipe were placed 17.2 g (0.1 mole) of 2,6-dichlorobenzonitrile, 16.02 g (0.1 mole) of 2,7-dihydroxynaphthalene, 16.585 g (0.12 mole) of potassium carbonate, 100 ml of sulfolane deaerated with argon and 50 ml of toluene which was an azeotropic solvent. A reaction was then carried out at 160° C. for 2 hours while argon gas was blowing thereinto, in order to distill off produced water together with toluene. The temperature of the reaction system was then raised up to 200° C., followed by a further reaction for 2 hours. After the completion of the reaction, the resulting product was cooled to room temperature and was thrown into methanol, thereby depositing therein and was recovered a polymer therefrom. The thus prepared polymer was then pulverized by means of a blender made by Warning Co., Ltd., and the pulverized material was washed with 2 l of hot water and subsequently 2 l of methanol and was dried at 120° C. for 8 hours under reduced pressure, thereby producing 25.92 g of the finished polymer.

Measurements were made for a concentration of the polymer at the time when the polymerization reaction was over and for a reduced viscosity ($\eta$sp/c) in a solution in which the polymer is dissolved in p-chlorophenol in the concentration of 0.2 g/dl. The results are set forth in the following table.

Further, for the investigation of thermal properties of the polymer, the glass transition temperature, the melting point and the thermal decomposition beginning temperature were measured, and the results are set forth in the table.

Next, from the thus prepared polymer, a pressed film was formed, and by the use of the thus formed film, the following mechanical properties were measured. The results are set forth in the table, That is, yield strength, breaking strength, tensile elastic modulus and elongation were measured in accordance with ASTM D 638, and bending strength and bending elastic modulus were measured in accordance with ASTM D 790.

EXAMPLE 6

The procedure of Example 5 was repeated with the exception that the amount of 2,7-dihydroxynaphthalene was 15.859 g (0.099 mole) in order to prepare a polycyanoaryl ether, and in the same manner, the respective properties were measured.

EXAMPLE 7

The procedure of Example 5 was repeated with the exception that there were used 24.08 g (0.14 mole) of 2,6-dichlorobenzonitrile, 22.2 g (0.1386 mole) of 2,7-dihydroxynaphthalene, 23.2 g (0.168 mole) of potassium carbonate, 100 ml of sulfolane and 70 ml of toluene and that the latter reaction temperature was 230° C., in order to prepare a polycyanoaryl ether, and the respective properties were measured in the same manner.

EXAMPLE 8

The procedure of Example 5 was repeated with the exception that there were used 6.888 g (0.04 mole) of 2,6-dichlorobenzonitrile, 6.343 g (0.0396 mole) of 2,7-dihydroxynaphthalene, 6.634 g (0.048 mole) of potassium carbonate, 100 ml of sulfolane and 50 ml of toluene, in order to prepare a polycyanoaryl ethr, and the respective properties were measured in the same manner.

EXAMPLE 9

The procedure of Example 5 was repeated with the exception that there were used 6.88 (0.04 mole) of 2,6-dichlorobenzonitrile, 6.343 g (0.0396 mole) of 2,7-dihydroxynaphthalene, 6.634 g (0.048 mole) of potassium carbonate 100 ml of sulfolane and 50 ml of toluene and that a polymerization reaction time was 3 hours, in order to prepare a polycyanoaryl ether, and the respective properties were measured in like manner.

The results of Examples 5 to 9 just described are set forth in the following table.

TABLE

| | Starting material | | Reaction conditions | | | |
|---|---|---|---|---|---|---|
| | 2,6-dichloro-benzonitrile (mole) | 2,7-dihydroxy-naphtalene (mole) | Temp. of polymerization reaction (°C.) | Time of polymerization reaction (hr) | Conc. of polymer (g/dl) | Reduced viscosity (dl/g) |
| Example 5 | 0.1 | 0.1 | 200 | 2 | 26 | 1.10 |
| Example 6 | 0.1 | 0.099 | 200 | 2 | 26 | 1.20 |
| Example 7 | 0.14 | 0.1286 | 230 | 2 | 36 | 1.43 |
| Example 8 | 0.04 | 0.0396 | 200 | 2 | 10 | 0.81 |
| Example 9 | 0.04 | 0.0396 | 200 | 3 | 10 | 0.89 |

| | Mechanical properties of polymer film | | | | | | Thermal property of polymer | | |
|---|---|---|---|---|---|---|---|---|---|
| | Yield strength (kg/cm$^2$) | Breaking strength (kg/cm$^2$) | Tensile elastic modulus (kg/cm$^2$) | Elongation (%) | Bending strength (kg/cm$^2$) | Bending elastic modulus (kg/cm$^2$) | Glass transition temp (°C.) | Melting point (°C.) | Thermal decomposition beginning temp. (°C.) |
| Example 5 | 1500 | 1400 | 30000 | 25 | 2600 | 35000 | 214 | 340 | 494 |
| Example 6 | 1700 | 1550 | 32000 | 20 | 2930 | 41300 | 214 | 343 | 498 |
| Example 7 | 1750 | 1630 | 32000 | 20 | 2900 | 42000 | 215 | 342 | 501 |
| Example 8 | 1260 | 1300 | 27000 | 40 | 2200 | 33500 | 210 | 344 | 518 |
| Example 9 | 1300 | 1240 | 28000 | 40 | 2100 | 32000 | 212 | 345 | 521 |

EXAMPLE 10

In a 10 l reactor equipped with a fractionating device, a stirrer and an argon gas blowing pipe were placed 860 g (5.0 mole) of 2,6-dichlorobenzonitrile, 793 g (4.95 mole) of 2,7-dihydroxynaphthalene, 830 g (6.0 mole) of potassium carbonate and solvents of 5 l of sulfolane and 2 l of toluene as solvents. A reaction was then carried out at 120° C. for 2 hours, at 160° C. for 1.5 hours and at 210° C. for 2 hours, while an argon gas was blowing thereinto. After completion of the reaction, the reactor was cooled to 60° C. When the concentration of the polymer in the resulting reaction mixture had reached a level of 15% by weight, 3 l of water were added thereto as a solvent used in the second process, followed by one hour's stirring at 70° C. For purification, the thus prepared polymer powder was washed 3 times with 10 l of water and once with 10 l of acetone. As a result, 1,280 g of a polycyanoaryl ethr powder was prepared.

The average grain diameter of the prepared powder was 40 μm. Further, the reduced viscosity ($\eta$sp/c) of the polymer was 0.95 dl/g at 60° C. in a solution in which the polymer is dissolved in p-chlorophenol in a concentration of 0.2 g/dl. Furthermore, the glass transition temperature (Tg) was 214° C.

Next, for the purpose of inspecting the purification degree of this polymer, the amount of potassium remaining in the polymer was measured by means of an atomic-absorption spectroscopy, and its amount was 110 ppm. Further, the volume resistivity was measured, and its value was $1.5 \times 10^{16} \Omega \cdot cm$.

EXAMPLE 11

A polymerization reaction was carried out in the same manner as in Example 10 with the exception that a mixture of 317 g (1.98 mole) of 2,7-dihydroxynaphthalene, and 475 g (2.97 mole) of 1,5-dihydroxynaphthalene was used in place of 2,7-dihydroxynaphthalene. The resulting reaction product was cooled to 50° C., and when the concentration of the polymer in the resulting reaction mixture had reached a level of 4% by weight, 3 l of ethyl alcohol were added as a solvent used in polycondensation to the reactor, followed by stirring. For purification, the thus prepared polymer powder was washed 3 times with 10 l of water and once with 10 l of acetone. As a result, 1,280 g of a polycyanoaryl ether powder were prepared. The average grain size of this powder was 40 μm. Further, under the same measurement conditions as in Example 10, the reduced viscosity (nsp/c) of the polymer was 1.05 dl/g, and the glass transition temperature (Tg) was 221° C.

The amount of remaining potassium in the polymer was 110 ppm, and a measured volume resistivity was $3 \times 10^{16} \Omega \cdot cm$.

COMPARATIVE EXAMPLE 1

After the polymerization reaction had been carried out in the same manner as in Example 1, a polymer was recovered without adding water at the step of cooling the reaction product, and was then pulverized by means of a blender made by Warning Co., Ltd. An average grain size of the thus prepared powder was 150 μm. For purification, this polymer powder was then washed 3 times with 10 l of water and once with 10 l of acetone. In the thus purified polymer, the amount of potassium remaining was 300 ppm and the volume resistivity was $4 \times 10^{15} \Omega \cdot cm$.

COMPARATIVE EXAMPLE 2

After the polymerization reaction had been carried out in the same manner as in Example 2, a polymer was recovered without adding ethyl alcohol at the step of cooling the reaction product, and was then pulverized by means of a blender made by Warning Co., Ltd. The average grain size of the thus prepared powder was 130 μm. For purification, this polymer powder was then washed 3 times with 10 l of water and once with 10 l of acetone. In the purified polymer, an amount of potassium remaining was 250 ppm and the volume resistivity was $2 \times 10^{15} \Omega \cdot cm$.

The polymer of this invention is excellent in heat resistance, mechanical strength, fire retardance and solvent resistance. Further, the method of this invention makes it possible to prepare a higher molecular weight polycyanoaryl ether with ease and with high productivity as compared with the conventional method. Moreover, if the method for preparing the polycyanoaryl ether powder of this invention is applied, the mechanical process for grinding the produced polymer will be unnecessary, and what is better, the powder prepared by this invention is finer than the conventionally pulverized powder. As a consequence, the subsequent purification process is carried out to a sufficient degree, and thus the amount of impurities in the polymer can be reduced remarkably, with the result that electrical properties, for example, electrical insulating properties, of the polymer can be improved. In short, this invention can provide polymers which are useful as materials of electrical, electronic and mechanical parts, and thus it is fair to say that the industrial value of this invention is great.

We claim:

1. A polycyano aryl ether which has recurring units represented by the formula:

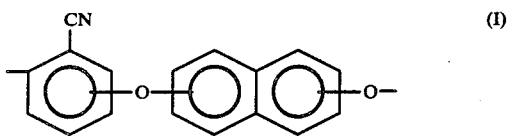

and has a reduced viscosity of 0.3 dl/g or more at 60° C. in a solution in which the polycyanoaryl ether is dissolved in p-chlorophenol in a concentration of 0.2 g/dl.

2. A method of preparing a polycyanoaryl ether which has recurring units represented by the formula:

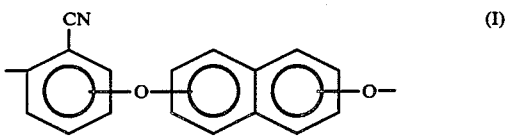

and has a reduced viscosity of 0.3 dl/g or more at 60° C. in a solution in which the polycyanoaryl ether is dissolved in p-chlorophenol in a concentration of 0.2 g/dl, which comprises reacting a dihalogenobenzonitrile represented by the formula:

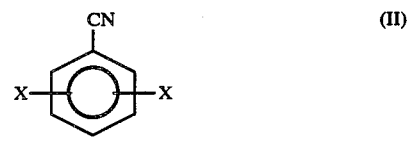

wherein X is a halogen atom,
with an alkali metal salt of dihydroxynaphthalene represented by the formula:

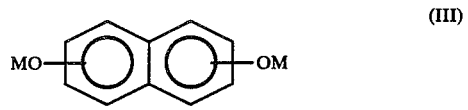

wherein M is an alkali metal,
in the presence of an aprotic polar solvent to form a reaction mixture and to polycondense the reactants (II) and (III) and form said polycyanoaryl ether in said reaction mixture.

3. The method according to claim 2, wherein the reaction is carried out in the presence of a monovalent phenol represented by the formula:

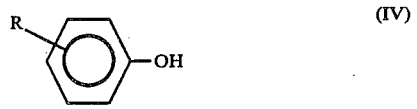

wherein R is a hydrogen atom, an alkyl group having 1 to 10 carbon atoms, an aryl group, an aralkyl group or a cyano group.

4. The method according to claim 2, wherein the alkali metal salt of dihydroxynaphthalene is at least one selected from the group consisting of the alkali metal salts of 2,7-dihydroxynaphthalene, 1,5-dihydroxynaphthalene and 1,6-dihydroxynaphthalene.

5. The method according to claim 2, wherein the dihalogenobenzonitrile and the alkali metal salt of dihydroxynaphthalene are each added in an amount of from 0.07 to 0.2 mole per deciliter of the solvent.

6. The method according to claim 2, wherein when the concentration of said polycyanoaryl ether in said reaction mixture is in the range of from 2 to 20% by weight, a second solvent which does not dissolve said polycyanoaryl ether and which is miscible with said aprotic polar solvent is added whereby said polycyanoaryl ether precipitates in the form of a fine powder.

7. The method according to claim 6, wherein said second solvent is selected from the group consisting of water, methanol, ethanol, propanol, butanol, acetone, methyl ethyl ketone, methyl isobutyl ketone, γ-butyrolactone and tetrachloroethane.

8. The method according to claim 2, wherein the alkali metal salt is sodium or potasium salt.

9. The method according to claim 2, the alkali metal salt of dihydroxynaphtalene represented by the formula (III) is obtained by employing independently dihydroxynaphtalene and a salt of an alkali metal.

10. The method according to claim 7, wherein the dihalogenobenzolitrile and the alkali metal salt of dihydroxynaphthalene are each added in an amount of from 0.07 to 0.2 mole per deciliter of the solvent.

11. The method according to claim 10, wherein the alkali metal salt of dihydroxynaphthalene is at least one selected from the group consisting of the alkali metal salts of 2,7-dihydroxynaphthalene, 1,5-dihydroxynaphthalene and 1,6-dihydroxynaphthalene, and said alkali metal is sodium or potassium.

12. The method according to claim 5, wherein the alkali metal salt of dihydroxynaphthalene is at least one selected from the group consisting of the alkali metal salts of 2,7-dihyroxynaphthalene, 1,5-dihyroxynaphthalene and 1,6-dihydroxynaphthalene, and said alkali metal is sodium or potassium.

13. The method according to claim 12, wherein said dihalogenobenzolitrile and said dihydroxynaphthalene are reacted in approximately equimolar amounts.

14. The method according to claim 11, wherein said dihalogenobenzolitrile and said dihydroxynaphthalene are reacted in approximately equimolar amounts.

15. The method according to claim 6, wherein said dihalogenobenzolitrile and said dihydroxynaphthalene are reacted in approximately equimolar amounts.

16. The method according to claim 2, wherein said dihalogenobenzolitrile and said dihydroxynaphthalene are reacted in approximately equimolar amounts.

17. The method according to claim 13, wherein the reaction is carried out in the presence of a monovalent phenol represented by the formula:

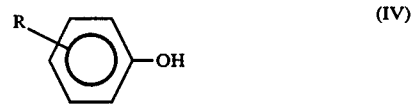

wherein R is a hydrogen atom, an alkyl group having 1 to 10 carbon atoms, an aryl group, an aralkyl group or a cyano group.

18. The method according to claim 11, wherein the reaction is carried out in the presence of a molovalent phenol represented by the formula:

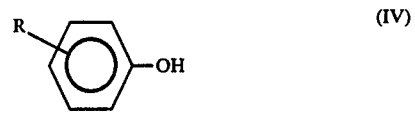

wherein R is a hydrogen atom, an alkyl group having 1 to 10 carbon atoms, an aryl group, an aralkyl group or a cyano group.

* * * * *